(12) United States Patent
Breuil et al.

(10) Patent No.: US 8,297,227 B2
(45) Date of Patent: Oct. 30, 2012

(54) METHOD AND DEVICE FOR INJECTING AT LEAST ONE PRODUCT IN AN EGG FOR TREATING THE EMBRYO

(75) Inventors: Jean-Pierre Breuil, Locquenole (FR); Vivienne Breuil, Locquenole (FR)

(73) Assignee: CEVA SANTE ANIMALE, societe anonyme, Libourne (FR)

( * ) Notice: Subject to any disclaimer, the term of this patent is extended or adjusted under 35 U.S.C. 154(b) by 1010 days.

(21) Appl. No.: 10/975,390

(22) Filed: Oct. 29, 2004

(65) Prior Publication Data

US 2005/0132964 A1 Jun. 23, 2005

Related U.S. Application Data

(63) Continuation of application No. PCT/FR03/01324, filed on Apr. 28, 2003.

(30) Foreign Application Priority Data

Apr. 30, 2002 (FR) ...................................... 02 05409

(51) Int. Cl.
*A01K 45/00* (2006.01)
(52) U.S. Cl. .......................................... 119/6.8; 119/6.6
(58) Field of Classification Search ................... 119/6.5, 119/6.6, 6.8, 50.7
See application file for complete search history.

(56) References Cited

U.S. PATENT DOCUMENTS

| | | | | |
|---|---|---|---|---|
| 3,616,262 A | * | 10/1971 | Coady et al. | 435/286.4 |
| 4,040,388 A | * | 8/1977 | Miller | 119/6.8 |
| 4,469,047 A | | 9/1984 | Miller | |
| 4,681,063 A | * | 7/1987 | Hebrank | 119/6.8 |
| 4,928,628 A | * | 5/1990 | Gassman et al. | 119/6.8 |
| 5,056,464 A | * | 10/1991 | Lewis | 119/6.8 |
| 5,136,979 A | * | 8/1992 | Paul et al. | 119/6.8 |
| 5,698,193 A | | 12/1997 | Kogut et al. | |
| 6,032,612 A | * | 3/2000 | Williams | 119/6.8 |
| 6,240,877 B1 | | 6/2001 | Bounds | |
| 6,244,214 B1 | | 6/2001 | Hebrank | |
| 6,286,455 B1 | * | 9/2001 | Williams | 119/6.8 |
| 6,499,428 B1 | * | 12/2002 | Prindle | 119/6.8 |
| 6,510,811 B1 | * | 1/2003 | Gore et al. | 119/6.8 |
| 6,601,533 B1 | * | 8/2003 | Bounds, Jr. | 119/6.8 |
| 2002/0023591 A1 | | 2/2002 | Bounds, Jr. | |

FOREIGN PATENT DOCUMENTS

WO 0040079 7/2000

* cited by examiner

*Primary Examiner* — David Parsley
(74) *Attorney, Agent, or Firm* — Greenblum & Bernstein, P.L.C.

(57) ABSTRACT

Method and device for injecting at least one product in an egg for treating the embryo. The method includes perforating a shell and an outer shell membrane on a large end of the egg, and injecting the product into an air chamber of the egg under pressure sufficient for the product to reach the amniotic fluid after passing with pressure through an inner shell membrane.

29 Claims, 1 Drawing Sheet

METHOD AND DEVICE FOR INJECTING AT LEAST ONE PRODUCT IN AN EGG FOR TREATING THE EMBRYO

CROSS-REFERENCE TO RELATED APPLICATIONS

The present application is a Continuation of International Patent Application No. PCT/FR03/01324 filed Apr. 28, 2003, and claims priority of French Patent Application No. 02/05409 filed Apr. 30, 2002. Moreover, the disclosure of International Patent Application No. PCT/FR03/01324 is expressly incorporated by reference herein in its entirety.

BACKGROUND OF THE INVENTION

1. Field of the Invention

The present invention relates to a method and a device for injecting at least one product in an egg, in particular of a bird, in order to treat the embryo.

2. Discussion of Background Information

It is known to vaccinate chicks against various diseases and/or to inject them with various substances or products for qualitative or quantitative purposes.

The treatment of embryos in the egg by injection is an important development, particularly in the chicken industry.

Indeed, this type of injection notably avoids the handling of chicks and substantially reduces the work that involved performing a subcutaneous injection on chicks, which are generally one day old, in hatcheries.

Moreover, it is understood that injection in the egg makes it possible to achieve an earlier immunity than that obtained with vaccination after hatching, which naturally increases the protection of the chick.

Vaccination in the egg is especially used against the Marek disease, but also experimentally against diseases such as the Gumbaro disease (IBD), the infectious bronchitis, the Newcastle disease, etc.

Up until now, these injections were carried out by means of injecting devices provided with at least one needle adapted to extend through the shell and the various membranes of the egg, in order to inject one or several products in the amniotic fluid and/or even in the embryo itself.

However, these devices generally carry, beyond the risks of injuring the embryo, the risk of causing a traumatism to the latter; and, in any case, these devices have substantial risks of contamination due to the contact of the needle with the amniotic fluid.

SUMMARY OF THE INVENTION

Accordingly, the present invention provides a method and a device which, in particular, limit the risks of contaminating and causing a traumatism to the embryo.

The method according to the invention includes, in particular, perforating the shell and the outer shell membrane on the large end of the egg by with a small tube, and injecting the product into the air chamber of the egg through the tube, under sufficient pressure so that the product reaches the amniotic fluid after passing with pressure through the inner shell membrane.

It is clearly understood that according to the invention, the injection occurs from the air chamber, contrary to the known prior art systems provided with a needle that penetrates into the extra-embryonic fluids, and sometimes into the embryo itself.

For example, the pressure for injecting the product is between 5 and 50 bars, and more particularly between 20 and 50 bars.

The invention also relates to a device that includes a perforating and injecting tube adapted to perforate the shell and the outer shell membrane, and to channel at least one product under sufficient pressure so that the product reaches the amniotic fluid after passing with pressure through the inner shell membrane.

For example, the perforating and injecting tube is fed by a piston that draws the product to be injected coming from a feed pipe in order to fill an injection chamber, and which then returns the product from the chamber to the perforating and injecting tube and, advantageously in this case, a nonreturn valve, adapted to allow the product to flow from the pipe toward the injection chamber, is arranged between the product feed pipe and the injection chamber. The injection chamber is separated from the perforating and injecting tube by another nonreturn valve that allows the product to flow from the chamber toward the tube.

Preferably, the perforating and injecting tube is protected by a sleeve that completely surrounds and protects the tube at rest. In this manner, the sleeve is movably mounted by being biased in this position by an elastic element, such that a force exerted on the end of the sleeve causes a movement of the latter, which then enables the tube to project from the sleeve.

In this case, advantageously, the sleeve is provided with a centering cupel adapted to partially cover the egg with which it comes into contact.

According to one embodiment, the device includes a feed pipe that communicates with the sleeve in order to be able to inject a disinfectant adapted to disinfect at least the outer surface of the penetrating portion of the perforating and injecting tube and/or the surface of the egg to be perforated.

Furthermore, the device can be provided, for example, with a displacement mechanism, particularly for raising-lowering the assembly, adapted to position the device on the egg to be treated and to remove it.

According to one embodiment, the displacement mechanism is connected to the device by an articulated coupling.

For example, the displacement mechanism includes a jack, the end of the shaft of which is connected to the device.

The present invention is directed to a method for injecting at least one product in an egg for treating the embryo. The method includes perforating a shell and an outer shell membrane on a large end of the egg, and injecting the product into an air chamber of the egg under pressure sufficient for the product to reach the amniotic fluid after passing with pressure through an inner shell membrane.

In accordance with a feature of the invention, the shell and outer shell membrane can be perforated with a small tube. Further, the product may be injected through the small tube.

According to another feature of the invention, the product can be injected at a pressure between 5 and 50 bars.

The present invention is directed to a device for injecting at least one product in an egg for treating the embryo. The device includes a perforating and injecting tube structured and arranged to perforate the shell and an outer shell membrane and to channel the at least one product under pressure sufficient for the product to reach the amniotic fluid after passing with pressure through an inner shell membrane.

According to a feature of the invention, the device can further include a piston and a feed pipe, in which the piston has an injection chamber. The piston may be structured and arranged to feed the perforating and injecting tube, such that"

the product is sucked into the injection chamber from the feed pipe and is forced from the chamber to the perforating and injecting tube.

Further, the device may include a nonreturn valve located between the feed pipe and the injection chamber. The nonreturn valve can be structured and arranged to allow product flow from the feed pipe to the injection chamber. The device can also include another nonreturn valve arranged to separate the injection chamber from the perforating and injecting tube and structured to allows product flow from the injection chamber to the perforating and injecting tube.

In accordance with still another feature of the present invention, a sleeve can be arranged to surround and protect the perforating and injecting tube at rest. The sleeve may be movably mounted, and the device can further include an elastic element structured and arranged to bias the sleeve in such a manner that a force exerted on an end of the sleeve relative movement between the sleeve and the perforating and injecting tube. In this manner, the force exerted on the end of the sleeve results in the perforating and injecting tube projecting from the sleeve. A centering cupel can be located at the end of the sleeve structured and arranged to partially cover the egg with which it comes in contact. Still further, a feed pipe, arranged to communicate with the sleeve, can be structured and arranged to inject a disinfectant to disinfect at least one of at least an outer surface of a penetrating portion of the perforating and injecting tube and a surface of the egg to be perforated.

According to a still further feature of the instant invention, a displacement mechanism may be structured and arranged for positioning on the egg to be treated and to be removed. The displacement mechanism can include a raising-lowering the assembly. Further, the displacement mechanism may be connected by an articulated coupling. The displacement mechanism can include a jack. Moreover, the jack may include a shaft, an end of which is connected to move the device.

The invention is directed to a method for treating an egg embryo. The method includes perforating a shell and an outer shell membrane of the egg, and injecting at least one product into an air chamber of the egg in such a manner that the at least one product reaches the amniotic fluid.

In accordance with still yet another feature of the present invention, the at least one product can be injected at a pressure to pass through an inner shell membrane. Further, the product may be injected at a pressure between 5 and 50 bars.

BRIEF DESCRIPTION OF THE DRAWINGS

The invention will be better understood upon reading the following description, with reference to the annexed drawings, in which.

DETAILED DESCRIPTION OF THE PRESENT INVENTION

Figure 1:
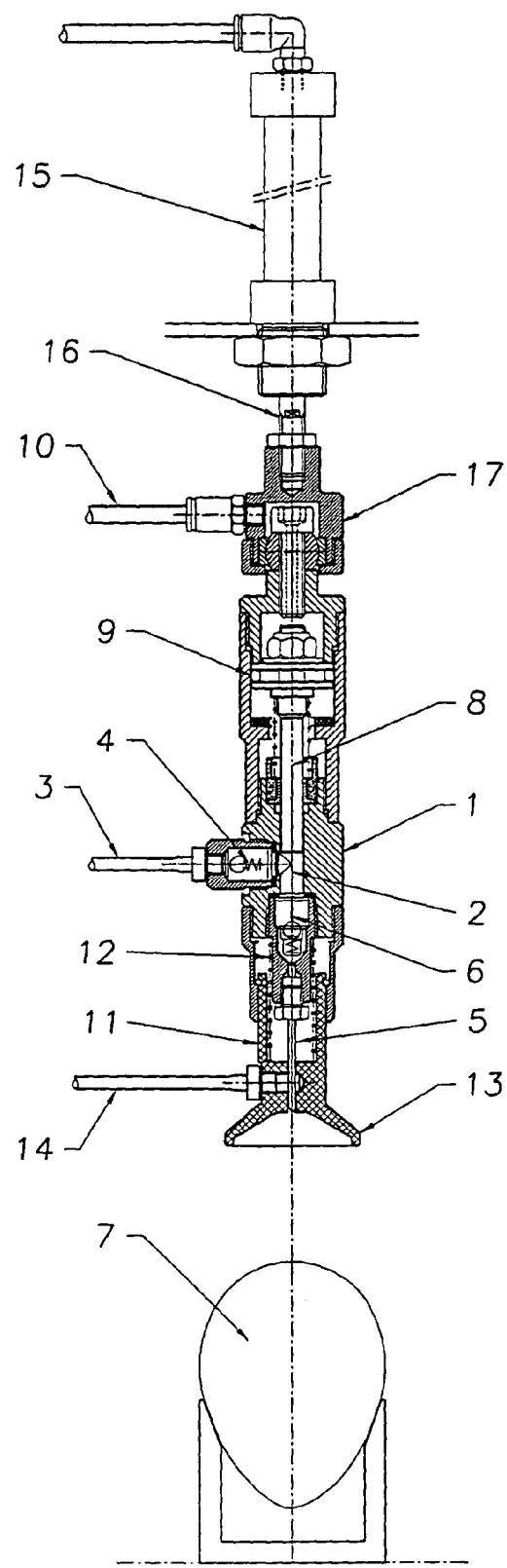
FIG. 1 shows a partial longitudinal cross-sectional view of an embodiment of a device according to the invention, in the raised position, FIG. 2 corresponds to FIG. 1 in the injecting position, the device being in contact with an egg to be treated.

The device shown comprises an injection body 1 that demarcates an injection chamber 2 (FIG. 1) having a variable volume as will be explained hereinafter.

The chamber 2 communicates with a pipe 3 for the inlet of the product to be injected via a nonreturn valve 4 adapted to prevent the product from flowing back from the chamber 2 toward the pipe 3.

The chamber 2 further communicates with a small perforating and injecting tube 5 (also called the trocar) through a nonreturn valve 6 adapted to allow the product in the injection chamber 2 to flow toward the tube 5 by preventing the return of the product from the tube 5 toward the chamber 2.

The tube 5 is thin and has an inner diameter between 0.4 and 0.8 mm, and an outer diameter between 1 and 1.6 mm.

Within the aforementioned ranges, which are provided by way of example, one can envision a tube, the inner and outer diameters of which are approximately 0.6 and 1.5 mm, respectively.

This tube is made out of a material, such as stainless steel, for example, that is sufficiently rigid to perforate the egg to be treated, schematically designated by the reference numeral 7 in the drawings, as will be explained hereinafter, and it advantageously comprises a chamfered end so as to perforate the egg 7 while limiting the risks of damaging the shell.

The injection chamber 2 is filled and emptied under pressure by a piston 8 actuated here by a single or double action pneumatic jack 9 supplied with air by a pipe 10. The maximum volume of the chamber 2 can thus be precise and constant, and can contain, for example, 0.1 ml-0.2 ml of product.

Naturally, the jack 9 could be replaced with any other quick release mechanical device (of the cam or eccentric type, for example).

As shown clearly in the drawings, the tube 5 is here further completely surrounded in the initial position or at rest (FIG. 1) by a protective sleeve 11 that is movably mounted at the end of the injection body 1, and which is maintained in the position of FIG. 1 by a compression spring 12.

This sleeve 11 which, at rest, completely hides the tube 5 by protecting the user, further comprises, at its end, an end piece in the form of a centering cupel 13 that is adapted to partially cover the egg 7 with which it is adapted to come in contact (FIG. 2), as will be explained hereinafter.

Advantageously, a feed pipe 14 communicates with the sleeve 11 so as to be capable of injecting, for example, a disinfectant on at least a portion of the outer surface of the tube 5.

As also shown in the drawings, the device is here further provided with a displacement mechanism, particularly for raising-lowering, in the form of a jack 15 and more precisely a micro-jack, the end of the shaft 16 of which is connected to the assembly described hereinabove by an articulated coupling 17 that makes it possible to compensate for certain small angular and radial deviations.

Naturally, it is clear that the jack 15 can be replaced by any other equivalent device, whether mechanical or electrical.

In view of the preceding description, the functioning is easy to understand.

After marking by candling a fertilized egg 7 to be injected, which has, for example, reached the final quarter of its incubation period, and more particularly its eighteenth day, the jack 15 is actuated and enables the device to be lowered on the egg. One thus goes from FIG. 1 to FIG. 2.

The injecting device, the chamber 2 of which is filled with the product to be injected (FIG. 1) is then positioned substantially in the center of the large end of the egg 7, on which the centering cupel 13 of the sleeve 11 comes to rest.

The device easily adapts to the diameter of the egg and can function even if the egg is not completely vertical.

Figure 2:
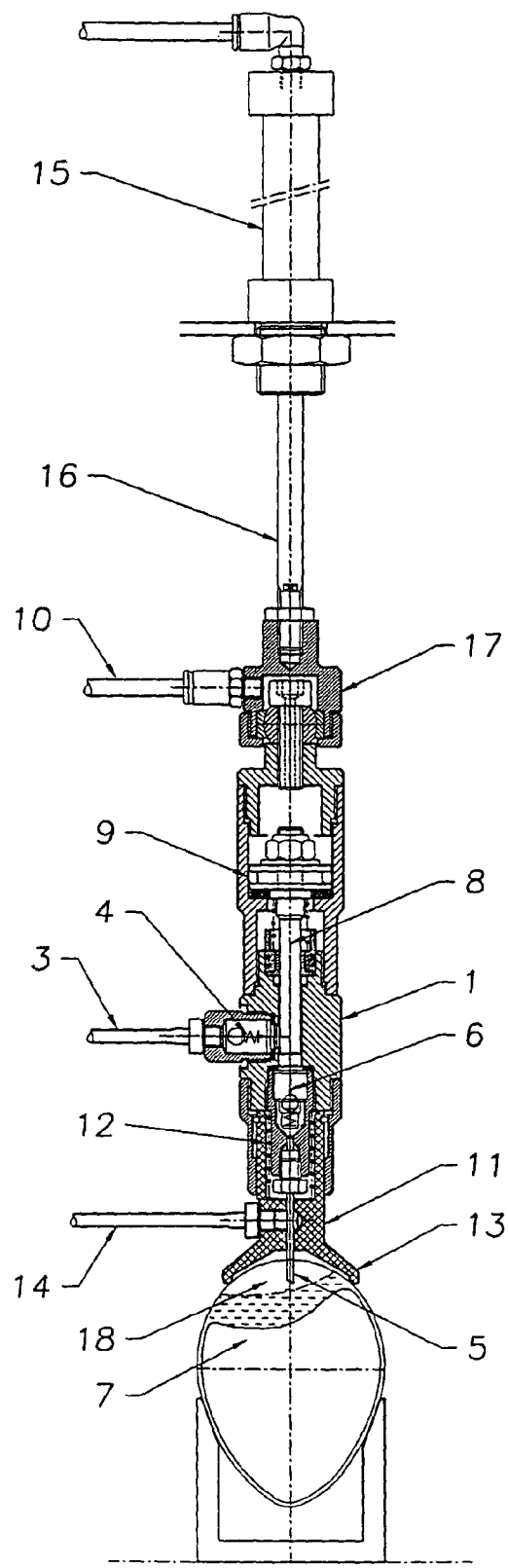

Upon contact of the cupel 13 with the egg, the spring 12 of the protective sleeve 11 is compressed, and the latter retracts into the body 1 or a portion fixed thereto, such as a guiding nut, thus enabling the tube 5 to project from the sleeve, to perforate the shell and the outer shell membrane of the egg in order to penetrate approximately 2-5 mm into the air chamber 18 of the egg (FIG. 2).

It is understood that the jack 15 is arranged so as to have a sufficient force to enable the tube 5 to perforate the shell of the egg 7 without exceeding the resisting pressure of the shell.

Due to this positioning, an air inlet through the pipe 10 enables the piston 8 to empty the product from the chamber 2 into the tube 5 by passing through the nonreturn valve 6 which opens up, whereas the nonreturn valve 4 prevents the product from returning to the pipe 3.

The product to be injected thus exits under pressure, and along a sufficiently thin jet at the end from the tube 5 into the air chamber 18. The pressure selected, comprised, for example, between 20 and 50 bars, being sufficient to pass through the shell inner shell membrane and to distribute the product in the amniotic fluid of the egg, the end of the tube 5 remaining in the air chamber 18.

As mentioned previously, the product thus injected is, for example, a vaccine solution or a therapeutic preparation.

Prior to and/or after this injection, a disinfectant can be sent into the sleeve 11 through the pipe 14 in order to disinfect at least the outer surface of the penetrating portion of the tube 5 and/or the surface of the egg before perforation, in order to avoid contamination of the product to be injected and/or of the apparatus and/or from one egg to the next.

After this operation, the raising of the piston 8 by the jack 9, if the latter is a double action jack, or automatically if the jack is a single action jack, creates a depression in the chamber 2 which is thus filled by suction according to a predefined volume, through the pipe 3 and the valve 4, the nonreturn valve 6 shutting the tube 5 in this direction.

The raising of the assembly by means of the jack 15 causes an extension of the sleeve 11 outside of the body 1, and one thus goes from FIG. 2 to FIG. 1 in the reverse direction, the device being ready for another injection with a new dose of the product.

Although only one injecting device has been described, the invention also provides grouping a plurality of devices for treating a plurality of eggs simultaneously.

Furthermore, all of the steps in the method according to the invention, mentioned above and claimed, are understood from the device described.

What is claimed:

1. A method for injecting at least one product in an egg for treating an embryo located in the egg, wherein the egg comprises a shell and an outer shell membrane, an air chamber on a large end of the egg and a chamber containing the embryo and an amniotic fluid, both chambers being separated by an inner shell membrane, comprising:
    perforating the shell and the outer shell membrane on the large end of the egg without perforating the inner shell membrane; and
    ejecting the at least one product under pressure into the air chamber of the egg and in a direction of the unperforated inner shell membrane,
    wherein the ejection pressure is sufficient for the at least one product ejected under pressure into the air chamber to contact and pass with pressure through the unperforated inner shell membrane to reach the amniotic fluid.

2. The method in accordance with claim 1, wherein the shell and outer shell membrane are perforated with a small tube.

3. The method in accordance with claim 2, wherein the product is injected through the small tube.

4. The method in accordance with claim 1, wherein the product is ejected at a pressure between 5 and 50 bars.

5. The method in accordance with claim 1, wherein a tube which injects the product penetrates the air chamber by approximately 2 to 5 mm.

6. The method in accordance with claim 1, wherein the product is ejected at a pressure between 20 and 50 bars.

7. The method in accordance with claim 1, wherein, before the perforating, the method further comprises positioning of the egg with respect to an injection device so that the injection device is placed substantially in a center of the large end of the egg.

8. A device for injecting at least one product in an egg for treating the embryo located, in the egg, wherein an egg comprises a shell and an outer shell membrane, an air chamber on a large end of the egg and a chamber containing the embryo and an amniotic fluid, both chambers being separated by an inner shell membrane, comprising:
    a positioning device to substantially center the device in a center of the large end of the egg;
    a perforating and injecting tube having an opened ejecting end able to perforate the shell and the outer shell membrane without perforating the inner shell membrane;
    a moving device to move the perforating and injecting tube from a position outside the egg substantially in the center of the large end of the egg to a position where the opened ejecting end is located inside the air chamber; and
    an ejecting device to eject the at least one product under pressure from the opened ejecting end into the air chamber, whereby the at least one product contacts the unperforated inner shell membrane and thereafter passes with pressure through the unperforated inner shell membrane to reach the amniotic fluid.

9. The device in accordance with claim 8, wherein the ejection device comprises a piston and a feed pipe, the piston having an injection chamber connected to the feed pipe,
    wherein the piston is structured and arranged to feed the perforating and injecting tube, such that the product is sucked into the injection chamber from the feed pipe and is forced from the injection chamber to the perforating and injecting tube.

10. The device in accordance with claim 9, further comprising a nonreturn valve located between a feed pipe and the injection chamber, wherein the nonreturn valve is structured and arranged to allow product flow from the feed pipe to the injection chamber.

11. The device in accordance with claim 10, further comprising another nonreturn valve arranged to separate the injection chamber from the perforating and injecting tube and structured to allow product flow from the injection chamber to the perforating and injecting tube.

12. The device in accordance with claim 8, further comprising a sleeve arranged to surround and protect the perforating and injecting tube at rest.

13. The device in accordance with claim 12, wherein the sleeve is movably mounted, and the device further comprises an elastic element structured and arranged to bias the sleeve in such a manner that a force exerted on an end of the sleeve enables relative movement between the sleeve and the perforating and injecting tube.

14. The device in accordance with claim 13, whereby the force exerted on the end of the sleeve results in the perforating and injecting tube projecting from the sleeve.

15. The device in accordance with claim 13, further comprising a centering cupel located at the end of the sleeve structured and arranged to partially cover the egg with which it comes in contact.

16. The device in accordance with claim 12, further comprising a feed pipe, arranged to communicate with the sleeve, that is structured and arranged to inject a disinfectant to disinfect at least one of at least an outer surface of a penetrating portion of the perforating and injecting tube and a surface of the egg to be perforated.

17. The device in accordance with claim 8, further comprising a displacement mechanism structured and arranged for positioning on the egg to be treated and to be removed.

18. The device in accordance with claim 17, wherein the displacement mechanism comprises a raising-lowering the assembly.

19. The device in accordance with claim 17, wherein the displacement mechanism is connected by an articulated coupling.

20. The device in accordance with claim 17, wherein the displacement mechanism comprises a jack.

21. The device in accordance with claim 17, wherein a jack comprises a shaft, an end of which is connected to move the device.

22. The device in accordance with claim 8, further comprising a device to supply the at least one product under pressure at an outlet of the opened ejecting end, wherein the pressure is sufficient for the at least one product to contact and then pass through the inner shell membrane to reach the amniotic fluid.

23. The device in accordance with claim 8, wherein the moving device and the perforating and injecting tube are arranged so the perforating and injecting tube penetrates 2-5 mm into the air chamber.

24. A method for injecting at least one product in an egg for treating an embryo located in the egg. Wherein the egg comprises a shell and an outer shell membrane, an air chamber on a large end of the egg and a chamber containing the embryo and an amniotic fluid, both chambers being separated by an inner shell membrane, comprising:
    perforating a shell and an outer shell membrane without perforating the inner shell membrane; and
    ejecting at least one product into an air chamber to contact and then pass through the unperforated inner shell membrane of the egg to reach the amniotic fluid.

25. The method in accordance with claim 24, wherein the at least one product is ejected at a pressure to pass through an inner shell membrane.

26. The method in accordance with claim 25, wherein the product is ejected at a pressure between 5 and 50 bars.

27. The method in accordance with claim 24, wherein a tube which injects the product penetrates the air chamber by approximately 2 to 5 mm.

28. The method of claim 25, wherein the product is ejected at a pressure between 20 and 50 bars.

29. The method in accordance with claim 25, wherein, before the perforating, the method further includes positioning of the egg with respect to an injection device so that the injection device is placed substantially in a center of the large end of the egg.

\* \* \* \* \*